(12) United States Patent
Larsson

(10) Patent No.: US 10,120,360 B2
(45) Date of Patent: Nov. 6, 2018

(54) CERTIFIED GENERIC DATA PROCESSING COMPONENT FOR CRITICAL TASK

(75) Inventor: Per-Erik Larsson, Luleaå (SE)

(73) Assignee: AKTIEBOLAGET SKF, Gothenburg (SE)

( * ) Notice: Subject to any disclaimer, the term of this patent is extended or adjusted under 35 U.S.C. 154(b) by 343 days.

(21) Appl. No.: 13/321,746

(22) PCT Filed: Apr. 29, 2010

(86) PCT No.: PCT/EP2010/002652
§ 371 (c)(1),
(2), (4) Date: Feb. 6, 2012

(87) PCT Pub. No.: WO2010/133287
PCT Pub. Date: Nov. 25, 2010

(65) Prior Publication Data
US 2012/0137160 A1    May 31, 2012

(30) Foreign Application Priority Data
May 20, 2009 (WO) ................. PCT/EP2009/003593

(51) Int. Cl.
*G06F 1/28* (2006.01)
*G05B 19/042* (2006.01)

(52) U.S. Cl.
CPC .. *G05B 19/0428* (2013.01); *G05B 2219/2224* (2013.01); *G05B 2219/24008* (2013.01); *G05B 2219/25234* (2013.01); *G05B 2219/25318* (2013.01)

(58) Field of Classification Search
CPC . G06F 1/30; G06F 1/3203; G06F 1/26; G06F 1/28; G06F 1/263; G05B 19/0428; G05B 2219/2224; G05B 19/24008; G05B 19/2534; G05B 19/25318
USPC .............................................. 361/54; 713/340
See application file for complete search history.

(56) References Cited

U.S. PATENT DOCUMENTS

| | | | |
|---|---|---|---|
| 5,184,215 A * | 2/1993 | Barker | 348/159 |
| 6,154,679 A | 11/2000 | Kessler et al. | |
| 2002/0126620 A1 | 9/2002 | Heckel et al. | |
| 2003/0093519 A1 | 5/2003 | Jackson et al. | |
| 2006/0200257 A1 | 9/2006 | Kirste et al. | |
| 2008/0285186 A1 | 11/2008 | Kothari et al. | |
| 2009/0021880 A1 | 1/2009 | Flay et al. | |

FOREIGN PATENT DOCUMENTS

| | | | | |
|---|---|---|---|---|
| CN | 2756613 Y | | 2/2006 | |
| CN | 101196837 A | | 6/2008 | |
| DE | 19929804 | * | 1/2000 | ........... G05B 19/042 |
| DE | 19929804 A1 | | 1/2000 | |

(Continued)

*Primary Examiner* — Zeev V Kitov
(74) *Attorney, Agent, or Firm* — Bryan Peckjian; SKF USA Inc. Patent Dept.

(57) ABSTRACT

A monitoring system for monitoring equipment has first data processing means for executing a primary, critical task and second data processing means for executing a secondary, non-critical task. The second data processing means receives its power supply from the first data processing means via protective circuitry so as to prevent electrical failures in the second data processing means from affecting operation of the first data processing means.

13 Claims, 2 Drawing Sheets

(56) References Cited

FOREIGN PATENT DOCUMENTS

| | | |
|---|---|---|
| EP | 0348758 A2 | 1/1990 |
| EP | 1517200 A1 | 3/2005 |
| EP | 1973017 A2 | 9/2008 |

\* cited by examiner

CERTIFIED GENERIC DATA PROCESSING COMPONENT FOR CRITICAL TASK

CROSS-REFERENCE

This application is the US national stage of International Application No. PCT/EP2010/002652 filed on Apr. 29, 2010, which claims priority to International Patent Application No. PCT/EP2009/003593 filed on May 20, 2009.

FIELD OF THE INVENTION

The invention relates to a data processing system for processing input data. The data processing system comprises first and second data processing means configured for performing primary and secondary data processing tasks, respectively. The invention also relates to first data processing means configured for use in such data processing system. The invention further relates to a monitoring system for monitoring an operational condition of equipment, a control system for controlling operational use of equipment, and to equipment comprising such monitoring system and/or such control system.

BACKGROUND ART

Consider, as an example, a monitoring system for monitoring the condition of equipment or machinery such as a wind turbine, a locomotive, one or more railway vehicles, a ship, a power plant, etc. The system monitors the state of one or more components, e.g., bearings, of the machinery. The term "monitoring" is used in this description in the sense of "systematically or regularly keeping track of the machinery's condition". As known, a bearing is a device that reduces the friction between mechanically coupled machine parts that move with respect to one another. The operational state of a ball bearing or a roller bearing can be determined by means of, e.g., comparing the bearing's current acoustic fingerprint to the fingerprint of the bearing when new. The monitoring system has an interface for receiving a signal from one or more sensors that sense the acoustic fingerprint of the bearings. The monitoring system further has a data processing system for processing input data indicative of the sensor signal. Assume that the data processing system is configured for the processing of data in order to perform a time-critical monitoring task and for the processing of data in order to perform a monitoring task that is not time-critical. The term "critical" is used in this text at least in the meaning of: being in, or verging on, a state of crisis or emergency, fraught with danger or risk, or perilous. An example of a critical monitoring task is raising an alarm as a result of an impending failure of (part of) the monitored machinery, a bearing in the example above. The fact that a failure is imminent is then inferred from the data representative of the current or most recent sensor signal. The alarm is used to invoke an automatic safety procedure. Such a procedure involves, e.g., inactivating the machinery or reducing its load or its speed, etc., or warning a human operator. A non-critical task is a task that does not immediately jeopardize the operational use of the machinery when the data processing system fails to properly or timely execute the task. An example of a non-critical monitoring task is the gathering of data over time for diagnostic or prognostic purposes.

A failure of the machinery may have severe consequences in terms of, e.g., casualties or costs involved in repairing the machinery and repairing the damage done to the environment. Consider, for example, an offshore wind turbine park. A wind turbine has a rotor mounted on a main shaft carried in bearings. In operational use, these bearings are subjected to cyclic stresses that may cause wear and material fatigue. The wear may result in a fluctuating torque being applied to the rotating rotor-main axle combination. The torque rapidly increases in magnitude, possibly leading to the bearings flying apart, and the rotor-axle combination being torn away from its support, further damaging the rotor blades, axle, support, and possibly other turbines nearby. Another example is railway vehicles, where bogie instability and/or a hot axle box can cause derailment. Accordingly, in view of possible loss of life(s), injuries, costs involved in repair and downtime, it is advisable to have monitoring systems in place. Such monitoring system monitors the condition of the railway vehicles or wind turbines and, if it determines the condition as being critical, raises an alarm in time so as to invoke a safety procedure.

The monitoring system as a whole, or the data processing system of the monitoring system, can be subjected to safety-certification. The system is then tested under pre-determined conditions, in order to be able to guarantee, to a high degree of certainty, the system's reliability in operational use. A monitoring system certified as a whole, or a certified data processing system, will function correctly under the applicable conditions. A certified product complies with pre-determined standards designed to ensure the safety and functionality of the product.

An example of a safety standard is IEC 61508. This standard provides functional safety requirements, requirements to help a system either work properly or fail in a predictable manner. These requirements can be used for many different types of systems including those with electrical, electronic and programmable electronic components. Requirements cover general safety management systems, specific product design requirements and design process requirements. The requirements provide coverage for both random hardware failures and systematic design faults. Another example of a safety standard is UIC 515, which describes safety functions such as hot axle box detection and bogie instability (hunting) detection. Other examples of standards are EN50126, EN50128 and EN50129.

A safety-related application is often part of a more complex control process. For example, a safety program is run together with a standard control program on common hardware. The standard control program addresses portions of the control process, wherein high reliability is not required. One obstacle to such a combination is the risk that the standard control program may corrupt the execution of the safety program, for example, by a misdirected reading or writing of the safety data or safety instructions. This then may modify the safety program in unexpected ways. Accordingly, the data processing system or monitoring system executing the control process is to be certified in its entirety. If the monitoring system or the data processing system were upgraded, a new certification would be required. A reason for this is that an upgrade may possibly interfere with carrying out the critical tasks. However, certification is a costly and time-consuming process. Note that failure of the product in operational use can cause severe material damages many orders of magnitude higher than the costs of the product or of the machinery of which the product is a component, failure of the product could possibly even lead to casualties. The certifying authority or the manufacturer then has to subject the product to rigorous tests in order to be (practically) certain that the product is reliable.

Within the field of monitoring machinery, e.g. railway vehicles and wind turbines, various different approaches are known in the public domain with regard to the design of a microprocessor system or microcontroller system, some of which are discussed below.

EP 1 973 017 discloses a safety-related control mechanism that is programmed in a memory and that has a central processing unit (CPU). The CPU has a multi-core processor with two or more processor cores. One of the processor cores is furnished for processing of conventional control software or automation software, and another processor core is furnished for the processing of the software for safety-related functions. This publication also mentions a conventional memory-programmed control system that comprises a CPU for usual control tasks and another CPU for processing under safety-related conditions. This publication also refers to other known control embodiments, among which the ones disclosed in EP 1 517 200 (corresponding to US 2005/060606, referred to further below).

US patent application publication 2006/0200257, incorporated herein by reference, relates to a microprocessor system for a machine controller in safety-certifiable applications. The microprocessor system is in the form of a system-on-chip (SoC) and includes a main processor, a program and/or data store, an input/output unit and a bus. The bus couples the components and at least one safety processor together. The safety processor has a dedicated program/data store. A safe transmission link is provided for loading programs and data into the safety processor. The transmission link includes the general bus and a mailbox. The mailbox has a state machine whose input is connected to the general bus and whose output is connected to the safety processor. As a result, program data can be written to the safety processor's program store without the risk of being manipulated. This makes it possible for the program data to be loaded into the safety processor safely using the bus which is not safe per se. The bus thus does not need to belong to the safe area. Certification of the microprocessor controller is thus simplified. The microprocessor system of US patent application publication 2006/0200257 is based on the idea of providing a transmission channel, which is protected against unauthorized corruption on the generally used bus which is not safe, and thus to enable safe communication with the safety processor. The system thus enables safe communication with the safety processor without the need for additional hardware for this purpose. This protected transmission channel is formed via the bus which is not safe per se and to which, on the one hand, the data source, which contains data which are to be protected and are intended for the safety processor's dedicated memory, in the unsafe area and, on the other hand, the mailbox at the junction to the safe area are connected. Accordingly, US patent application publication 2006/0200257 teaches using a system with a main processor and a safety processor coupled to each others and to peripherals via a bus system for bi-directional communication. The system is provided with a safe transmission channel for loading programs and data to the safety processor.

US application publication 2005/0060606, incorporated herein by reference, relates to a safety controller that may execute both standard programs and safety programs. The safety controller uses shared hardware with reduced risk of corruption of the safety program by the standard program. This reduced risk of corruption is obtained by executing the safety program on two processors but executing the standard program on only one of these processors. Any corruption of the safety program by the standard program will be confined to a single processor and will thus be easily detected in a comparison of the execution of the two processors. Specifically, the safety controller has a primary processing unit having a first processor communicating with a first memory holding both the safety program and a separate standard program. A partner processing unit has a second processor, independent from the first processor that communicates with a second memory independent from the first memory and holds the safety program and not the separate standard program. Synchronization programs executable by the primary and partner processing units execute the standard program in the primary processing unit and execute the safety programs in the primary and partner processing units and compare execution of the safety programs to enter a safety state when this execution differs. The primary processing unit may be in a first housing and the partner processing unit may be in a second housing independent from the first housing. A communication bus may communicate between the first and second housings to allow intercommunication between the primary and partner processing units.

SUMMARY OF THE INVENTION

The known systems, briefly discussed above, distinguish between safety-related programs or tasks and non-safety related programs or tasks. Some of these known systems also distinguish between a processor dedicated to a safety-related task, and a processor for executing non-safety-related tasks.

The invention is also based on distinguishing between a data processing means configured for executing a primary task, e.g., a critical or safety-related task, and other data processing means configured for executing a secondary, e.g., non-critical or non-safety-related task. However, the invention takes an approach different from the known ones.

An aspect of the invention is based on the following considerations. Data processing means for executing a primary, e.g., safety-related, task is preferably a certifiable or certified data processing means. Data processing means, as used in this text, is, e.g., a microprocessor, a microcontroller, a data processing assembly. A data processing assembly is implemented, e.g., on a circuit board, or as a system-on-chip. It is advantageous to use a modular approach in designing a data processing system for use in a monitoring system for monitoring the operational condition of machinery. The modular approach then uses a module with first data processing means for executing primary tasks, e.g., safety-related or time-critical tasks, and another module with second data processing means for executing secondary tasks, not related to safety issues, or related to non time-critical tasks. An advantage of this modular design resides in the fact that only the safety-related data processing means need to be certified so as to have the data processing system comply with the requirements imposed on the relevant time-critical or safety-related task(s). However, if the data processing system uses data communication from the second data processing means to the first data processing means, certification of the safety-related first data processing means is only reliable for certain scenarios. That is, only those scenarios can be taken into account, wherein the interaction between first and second data processing means is known in advance. That is, it is known in advance what data is exchanged and it is known in advance what voltages and currents are involved in the interaction. If the second data processing means is replaced, or upgraded with new control software, the certification of the first data processing means may not be applicable anymore as the data or signals received by the first data processing means, individually or in a certain combination, have not been tested. Similarly, consider the safety-related first data processing means as a generic building block. Assume now that the generic building block is being used in different combinations with different, second data processing means executing different non-critical tasks. Then, the first data processing means needs to be certified for use with each individual one of the second data processing means.

The invention now proposes a data processing system with a modular configuration, wherein a module is used for the data processing involved in a primary or critical task, and another module for data processing involved in a secondary or non-critical task.

A first embodiment of the proposed invention relates to a data processing system that is configured for processing input data. The data processing system comprises first data processing means and second data processing means. The first data processing means is configured for performing a primary data processing task. The second data processing means is configured for performing a secondary data processing task. The first data processing means has a first power input for connection to a power supply, and also has a first power output. The second data processing means has a second power input connected to the first power output. That is, the second data processing means is powered from the first data processing means. The first data processing means has a protective circuit between the first power input and the first power output. The protective circuit is configured for preventing the second data processing means from affecting operation of the first data processing means via the first power input. For example, the protective circuit comprises a current limiter, a fuse or other overload protection device, a relay, a circuit breaker, a power converter, or any combination thereof.

Accordingly, the second data processing means receives its power supply from the first data processing means and via protective circuitry so as to prevent electrical failures in the second data processing means from affecting operation of the first data processing means via the power supply.

The rationale for this aspect of the invention is as follows. The first data processing means is configured for executing a critical task. The first data processing means is therefore to serve as a reliable execution environment, and may be certified as such. The certified or certifiable first data processing means is then used as a modular building block in a combination with one or more particular ones of a variety second data processing means, i.e., a variety of different types of second data processing means. The functioning or malfunctioning of the second data processing means should have no influence on the functioning of the first data processing means, whatever the tasks of the second data processing means. By means of indirectly powering second data processing means from the power supply, having an intervening protective circuitry in-between, short circuits or power surges occurring in the second data processing means do not backfire on the first data processing means via the latter's power supply input. This enables the use of a single power supply. The alternative would be to have a separate power supply for each processing means.

In a second embodiment of the data processing system in the invention, the first data processing means has a first data input for receiving the input data, and a first data output for supply of output data. The second data processing means has a second data input connected to the first data output. The first data processing means has a further protective circuit for supply of the output data to the first data output. The further protective circuit is configured for preventing the second data processing means from affecting operation of the first data processing means via at least one of the first data output and the first data input. The further protective circuit is, for example, a buffer amplifier.

In this second embodiment, the second data processing means receives its input data from the first data processing means via a further protective circuit. For example, the input data is provided to the first data processing means for being subjected to data processing operations in the primary task. This input data is also supplied to the second data processing means. However, the input data is supplied to the second data processing means via the further protective circuitry. In another example, the input data as supplied to the second data processing means is generated by the first data processing means as a result of the latter's processing of the input data supplied to the data processing system via a suitable interface. Accordingly, the further protective circuitry thus isolates the input data to the first data processing means from the same, or other, input data to the second data processing means.

The operation of the protective circuitry in the first embodiment addresses the power supply. The operation of the further protective circuitry in the second embodiment addresses the input data. Note that these protective measures are based on the same insight. Namely, any electrical malfunctioning in the second, non-critical, data processing means is prevented from affecting the operation of the first, critical, data processing means via a path in their electrical interface. This applies to the signal path as well as to the power supply path. Accordingly, a further embodiment of the data processing system in the invention may comprise the further protective circuitry as specified above, for protection of the signal path, and may manage without the protective circuitry first-mentioned that sees to the decoupling of the power supply of the first processing means and the power supply to the second data processing means. For example, the first data processing means has its own power supply (a first battery) independent of the power supply (a second battery) of the second data processing means.

Above embodiments are relevant to commercially exploiting the data processing system as specified, comprising the first and second data processing means. The invention can also be commercially exploited as the first data processing means, provided with the power supply protective circuitry and/or with the further protective circuitry. Such first data processing means can then be used as a generic building block and can be certified as such for applications.

Furthermore, the invention also relates to a control system for controlling operational use of equipment, wherein the control system comprises the data processing system as specified above. Such a control system is then configured for carrying out primary and secondary control tasks. The primary control task is considered more critical than the secondary control task. For example, the brakes of a motorized vehicle should always be operational, whether or not the vehicle has a servo braking system or sophisticated electronic braking control features such as an anti-lock braking system or a traction control system. Accordingly, the electronically controlled basic braking functionality is then preferably controlled by the first data processing means and the sophisticated features are then controlled by the second data processing means.

The invention also relates to monitoring system for monitoring an operational condition of equipment, wherein the monitoring system comprises a sensor for generating a sensor signal indicative of the operational condition, and the data processing system as specified above, wherein the data processing system is configured monitoring the operational condition of the equipment on the basis of the input data representative of the sensor signal.

The invention further relates to equipment comprising such control system and/or such monitoring system.

None of above mentioned publications teaches or suggests the invention of protecting the electrical interface between the first, critical, data processing means and the second, non-critical, data processing means in the manner specified in the invention.

The invention is especially applicable to monitoring equipment, devices, systems or vehicles comprising rotating or reciprocating parts. The invention is especially advantageous in systems monitoring railway applications, e.g. high speed trains, where a critical data processing is for example determining if there is bogie instability or a hot axle box.

BRIEF DESCRIPTION OF THE DRAWINGS

The invention is explained in further detail, by way of example and with reference to the accompanying drawing, wherein.

Throughout the Figures, similar or corresponding features are indicated by same reference numerals.

DETAILED EMBODIMENTS

As used herein, the expression "data processing means" broadly refers to a computer, a processor, a microcontroller, a microcomputer, a programmable logic controller (PLC), an application specific integrated circuit (ASIC), another programmable or hardwired electronic circuit, or a combination thereof.

Figure 1:
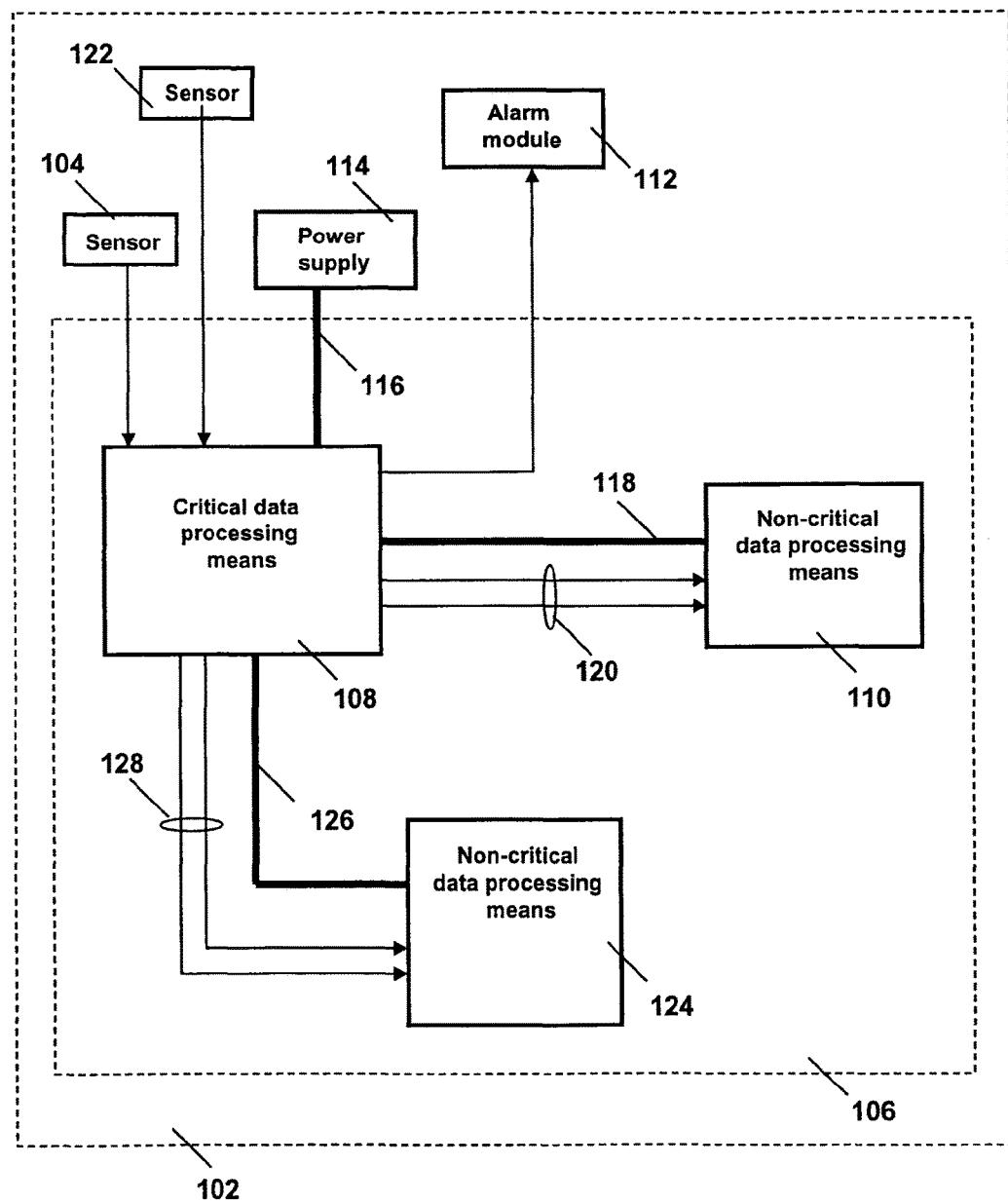
FIG. 1 is a block diagram of machinery with the monitoring system in the invention.

FIG. 1 is a block diagram of equipment 100 according to the invention. Equipment 100 comprises, e.g., a wind turbine, a locomotive, a ship, a power plant, etc. Equipment 100 is equipped with a monitoring system 102 for monitoring a condition of the equipment 100 in operational use. To this end, the monitoring system 102 has an interface for receiving a sensor signal from a sensor 104. The sensor 104 is operative to generate the sensor signal in dependence on a physical quantity representative of the condition. An example of the operational condition of the equipment is determined on the basis of, e.g., a temperature of a bearing being monitored or an acoustic fingerprint of the bearing being monitored. The monitoring system 102 comprises a data processing system 106 configured for processing input data representative of the sensor signal in order to determine the condition.

The data processing system 106 comprises first data processing means 108 and second data processing means 110. The data processor means 108 and 110 are physically separated from one another. Each of the data processing means 108 and 110 is implemented as, e.g., a microprocessor, a microcontroller, or a data processing assembly. Such an assembly is implemented as, for example, a circuit board, or a system-on-chip. The first data processing means 108 is configured for performing a first task comprising generating output data indicative of the condition as currently determined, if the current condition is critical to the operational use. The first data processing means 108 supplies the output data to, e.g., an alarm module 112. The alarm module 112 is operative to invoke an alarm procedure in order to remove the criticality of the condition. Examples of such an alarm procedure are manifold. For example, the alarm procedure stops or disables operation of the equipment 100. As another example, the alarm procedure causes the equipment 100 to idle, or reduce its load or speed so as to bring the operational condition back into a safe region of its operational parameter space. As yet another example, the alarm procedure raises an alarm with a human operator, etc. The second data processing means 110 is configured for performing a second task that is not critical to the operational use. For example, the second data processing means 110 processes data representative of the sensor signal for prognostic or diagnostic purposes, for administrative purposes, or for other purposes relevant to a longer time scale than that of a critical task mentioned above. The first data processing means 108 has a first power input connected to a power supply 114 via a connection 116.

An interesting aspect of an embodiment of the invention is that the second data processing means 110 has a second power input connected to the first data processing means 108 via an electrical connection 118 for being powered from and by the first data processing means 108. In order to put this into a proper context, imagine that the second data processing means 110 were also connected directly to the power supply 116. As explained earlier, the second data processing means 110 is designed for non-critical tasks and does not necessarily have to comply with strict standards to ensure operational reliability. If the second data processing means 110 were connected directly to the power supply 114, the second data processing means 110 would be able to hamper operation of the first data processing means 108 via the power supply 116. For example, assume that a short-circuit was to develop in the second data processing means 110. The voltage or current, which the power supply 116 is capable of supplying to the first data processing means 108, would then be affected and therefore the operational reliability of the first data processing means 108. In the invention, the second data processing means 110 is powered from a protecting circuit instead, accommodated in, or at, the first data processing means 108. This protecting circuit is operative to prevent the operation of the first data processing means 108 from being affected by a short-circuit or power surge in the second data processing means 110. The preventive measure here involves electrically coupling the second data processing means 110 indirectly to the power supply 114 that also supplies the first data processing means 108. For example, the protecting circuit comprises a current limiter in the supply path to the second data processing means 110, or a fuse or another overload protection, a relay, a circuit breaker, a power converter, etc. Such protective circuitry is known in the art and is not discussed herein in further detail. Accordingly, reliable operation of the first data processing means 108 is maintained regardless of electrical faults in the second data processing means 110, owing to the second data processing means 110 being powered indirectly from the first data processing means 108.

A further interesting aspect of an embodiment in the invention is that the second data processing means 110 has a second data input connected to the first data processing means 108. The second data processing means 110 receives input data, representative of the sensor signal, from the first data processing means 108 via an electrical connection 120. There is no direct electrical connection between the sensor 104 and the second data processing means 110, as the second data processing means 110 receives its input data via further protective circuitry in the first data processing means 108. The further protective circuitry electrically decouples the second data processing means 110 from the sensor 104 and from the data input to the first data processing means 108. This further protective circuitry may include, e.g., a buffer in the signal path between the sensor 104 and the second data processing means 110. The further protective circuitry may also form a functional part of the first data processing means 108, so that the second data processing means 110 receives input data that represent a result of the processing, by the first data processing means 108, of the data representative of the sensor signal from the sensor 104. As first data processing means 108 is configured for carrying out a critical task, an embodiment of the first data processing means 108 has its inputs and outputs protected, e.g., via diodes, capacitors, inductances, or active circuitry such as buffers, so as to electrically decouple the sensitive circuits of the first data processing means 108 from their electrical environment. Such protective measures are known in the art and are not discussed herein in further detail.

In order to explain this further aspect of the invention, imagine that the sensor 104 has an output connected to both the first data processing means 108 and the second data processing means 110. Under such circumstances, an electrical fault developed in the second data processing means 110 may result in the output of the sensor 104 being affected. As a consequence, the first data processing means 108 may receive a sensor signal that is not representative of the actual condition of the equipment 100. For example, the affected sensor signal causes the first data processing means 108 to raise a false alarm, whereas the condition of the equipment 100 does not warrant raising the alarm. Alternatively, the affected sensor signal may cause the first data processing means 108 to assume that all is well, whereas the actual condition of the equipment 100 is indeed critical.

Aspects of the invention have been discussed with reference to the first data processing means 108, the second data processing means 110, and the sensor 104. It is clear that the invention is applicable to scenarios, wherein there are further first data processing means present (not shown) in addition to the first data processing means 108. Similarly the invention is likewise applicable to scenarios, wherein there is more than one sensor present, e.g., the sensor 104 and a sensor 122, and/or wherein there are multiple second data processing means, such as the second data processing means 110 and additional second data processing means 124. The additional second data processing means 124 is then similarly powered from the first data processing means, here the first data processing means 108, via protective circuitry and a connection 126, and receives its input data from the first data processing means 124 or another first data processing means (not shown), via further protective circuitry and via a connection 128. The additional second data processing means 124 may be powered via the same protective circuitry as the second data processing means 110, or via other protective circuitry. If other protective circuitry is being used, failures in the second data processing means 110 do not affect the power supply to the additional second data processing means 124 and vice versa. Similarly, the additional second data processing means 124 may receive input data via the same further protective circuitry as the second data processing means 110, or via other further protective circuitry. If other further protective circuitry is being used, failures in the second data processing means 110 do not affect the input data to the additional second data processing means 124, and vice versa.

Figure 2:
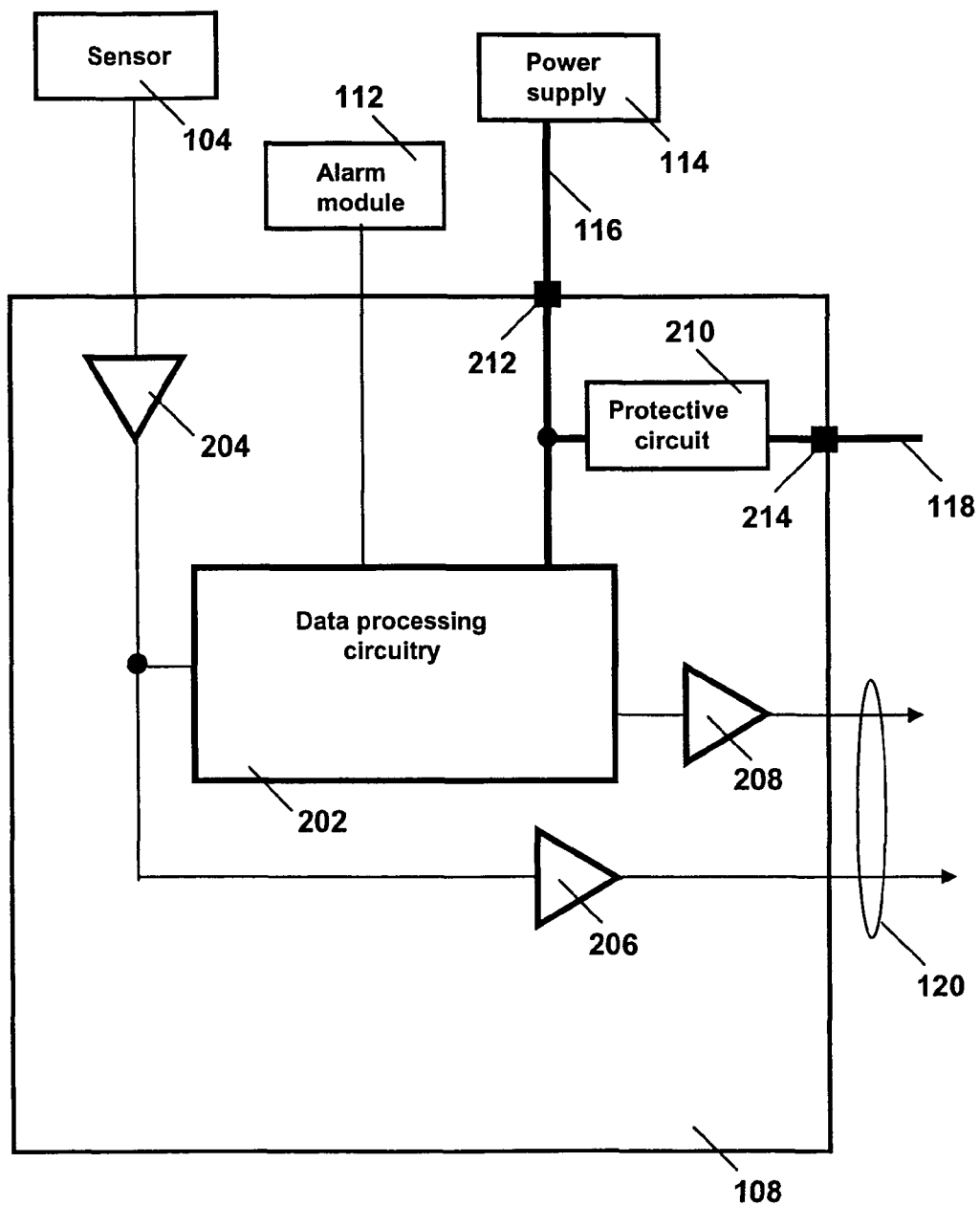
FIG. 2 is a block diagram of first data processing means for use in the monitoring system of the invention.

FIG. 2 is a block diagram of an embodiment of the first data processing means 108 configured for use in the data processing system 106 of the monitoring system 102, as discussed above with reference to FIG. 1. The protective measures mentioned above with reference to FIG. 1 are discussed in further detail with reference to FIG. 2.

The first data processing system 108 in this embodiment comprises data processing electronic circuitry 202 such as, for example, a data processor or a microcontroller, an array of such processors or controllers, a data processing subsystem, etc. The circuitry 202 has a data input coupled to the output of the sensor 104 via an input buffer 204 or via another circuit that serves to prevent the output of the sensor 104 from unacceptably loading the circuitry 202 and thus from interfering with the desired operation of the latter. The output of the input buffer 204, and therefore the input of the circuitry 202, is connected to an output buffer 206 for coupling to the data input of the second data processing means 110. A data output of the circuitry 202 is coupled to another data input of the second data processing means 110 via a second output buffer 208. The output buffers 206 and 208 prevent the second data processing means 110 from unacceptably loading circuitry 202.

The first data processing means 108 further comprises a protective circuit 210 for supplying power to the second data processing means 110. The protective circuit 210 is connected between a power input 212 of the first data processing means 108 and a power output 214 of the first data processing means 108. The protective circuit 210 serves to prevent the second data processing means 110 from unacceptably loading the power supply 114 so as to prevent an electrical fault occurring in the second data processing means 110 from affecting the operation of the circiutry 202 via the power input 212. The circuit 210 comprises, e.g., a current limiter in the supply path to the second data processing means 110, or a fuse or another overload protection, a relay, a circuit breaker, a power converter, etc. Although not explicitly shown in order to not obscure the drawings, the buffers 204, 206 and 208 are suitably directly powered from the power supply 114.

The invention claimed is:

1. A data processing system for processing input data, comprising:
    a first data processor configured for performing a primary data processing task, wherein the first data processor comprises:
        a first power input for connection to a single power supply;
        a first power output; and
        a protective circuit between the first power input and the first power output,
    wherein the protective circuit comprises a fuse or a current limiter; and
    a second data processor configured for performing a secondary processing task, wherein the second data processor comprises a second power input connected to the first power output such that the first data processor and the second data processor are powered only via the single power supply during functioning or malfunctioning of the second data processor, such that the first data processor and the second data processor do not each have separate power supplies,
    wherein the protective circuit of the first data processor is configured for preventing operation of the second data processor from affecting operation of the first data processor via the first power input.

2. The data processing system of claim 1, wherein:
the first data processor has a first data input for receiving the input data; and wherein
the first data processor has a first data output for supply of output data; and wherein
the second data processor has a second data input connected to the first data output; and wherein
the first data processor has a further protective circuit for supply of the output data to the first data output; and
the further protective circuit is configured for preventing operation of the second data processor from affecting operation of the first data processor via at least one of the first data output and the first data input.

3. The data processing system of claim 2, wherein:
the output data is the input data; and
the further protective circuit is connected to the first data input and to the first data output.

4. The data processing system of claim 2, wherein the first data processor is operative to generate the output data by processing the input data.

5. The data processing system of claim 2, wherein the further protective circuit comprises a buffer amplifier.

6. A data processing system for processing input data, comprising:
first data processing means and second data processing means; and wherein
the first and second data processing means are powered only by a single power supply during functioning or malfunctioning of the second data processing means, such that the first and second data processing means doe not each have separate power supplies; and wherein
the first data processing means is configured for performing a primary data processing task; and wherein
the second data processing means is configured for performing a secondary data processing task; and wherein
the first data processing means has a first data input for receiving the input data; and wherein
the first data processing means has a first data output for supply of output data; and wherein
the second data processing means has a second data input connected to the first data output; and wherein
the first data processing means has a first protective circuit that comprises a fuse or a current limiter; and wherein
the first data processing means has a second protective circuit for supply of the output data to the first data output; and wherein
the second protective circuit is configured for preventing operation of the second data processing means from affecting operation of the first data processing means via at least one of the first data output and the first data input.

7. The data processing system of claim 6, wherein:
the output data is the input data; and
the second protective circuit is connected to the first data input and to the first data output.

8. The data processing system of claim 6, wherein the first data processing means is operative to generate the output data by processing the input data.

9. The data processing system of claim 6, wherein the second protective circuit comprises a buffer amplifier.

10. A monitoring system for monitoring an operational condition of equipment, the monitoring system comprising:
a sensor for generating a sensor signal indicative of the operational condition; and
a data processing system comprises first data processing means and second data processing means; wherein
the first data processing means is configured for performing a primary data processing task; and wherein
the first data processing means has a first power input for connection to a single power supply, and a first power output; and wherein
the first data processing means has a protective circuit between the first power input and the first power output, wherein the protective circuit comprises a fuse or a current limiter, and wherein
the second data processing means has a second power input connected to the first power output such that the first data processing means and the second data processing means are powered only via the single power supply during functioning or malfunctioning of the second data processing means, such that the first data processing means and the second data processing means do not each have separate power supplies; and wherein
the protective circuit is configured for preventing operation of the second processing means from affecting operation of the first data processing means via the first power input, and wherein
the data processing system is configured for monitoring the operational condition of the equipment on the basis of the input data representative of the sensor signal.

11. The data processing system of claim 1, wherein the second data processor is not connected to a separate power supply.

12. The data processing system of claim 1, wherein the first data processor continues to be powered by the single power supply via the first power input even when the protective circuit of the first data processor prevents operation of the second data processor from affecting operation of the first data processor.

13. The data processing system of claim 1, wherein the first data processor continues to be powered by the single power supply via the first power input even when a fault occurs in the second data processor.

* * * * *